(12) United States Patent
Marple et al.

(10) Patent No.: US 7,992,473 B2
(45) Date of Patent: Aug. 9, 2011

(54) PIPE CUTTING APPARATUS AND METHOD OF USING THE SAME

(76) Inventors: Melvyn James Marple, Douglassville, PA (US); James Arthur Marple, Newtown, CT (US)

(*) Notice: Subject to any disclaimer, the term of this patent is extended or adjusted under 35 U.S.C. 154(b) by 373 days.

(21) Appl. No.: 11/827,333

(22) Filed: Jul. 11, 2007

(65) Prior Publication Data

US 2008/0016696 A1   Jan. 24, 2008

Related U.S. Application Data

(60) Provisional application No. 60/819,845, filed on Jul. 11, 2006.

(51) Int. Cl.
*B23B 3/22* (2006.01)
(52) U.S. Cl. .................... 82/113; 82/128
(58) Field of Classification Search .............. 82/1.11, 82/113, 70.2, 130, 128, 101, 131; 30/92, 30/95, 97; 29/33 T; 83/490; 408/146; *B23B 3/22*
See application file for complete search history.

(56) References Cited

U.S. PATENT DOCUMENTS

| | | | |
|---|---|---|---|
| 2,842,238 A | 7/1958 | Shaw et al. | |
| 3,942,248 A | 3/1976 | Sherer et al. | |
| 3,985,051 A | 10/1976 | Brown | |
| 4,114,484 A * | 9/1978 | Feamster, III | 82/113 |
| 4,377,276 A | 3/1983 | Kataoka | |
| 4,384,901 A | 5/1983 | Swoboda, III et al. | |
| 4,402,136 A | 9/1983 | Rast | |
| 4,411,178 A * | 10/1983 | Wachs et al. | 82/113 |
| 4,682,919 A | 7/1987 | Mitchell | |
| 4,739,685 A * | 4/1988 | Ricci | 82/113 |
| 4,770,074 A * | 9/1988 | Kwech | 82/113 |
| 4,776,248 A | 10/1988 | Birkestrand | |
| 4,813,314 A * | 3/1989 | Kwech | 82/113 |
| 4,939,964 A * | 7/1990 | Ricci | 82/113 |
| 5,088,196 A | 2/1992 | Fukuda | |
| 5,103,699 A | 4/1992 | Brown | |
| 5,261,301 A | 11/1993 | Babb et al. | |
| 5,392,502 A | 2/1995 | Freer | |
| 5,394,776 A | 3/1995 | Robinson | |
| 5,549,024 A | 8/1996 | Ricci | |
| 5,605,083 A | 2/1997 | Lupke et al. | |
| 5,660,093 A * | 8/1997 | Ricci | 82/113 |
| 5,775,188 A * | 7/1998 | Strait | 82/1.11 |
| 5,836,079 A | 11/1998 | Cronin et al. | |
| 5,894,772 A | 4/1999 | Nodar | |
| 5,920,989 A | 7/1999 | Taylor | |
| 6,065,212 A | 5/2000 | Lazarevic | |
| 6,065,378 A * | 5/2000 | Ricci | 82/128 |
| 6,335,508 B1 | 1/2002 | Nam | |

(Continued)

*Primary Examiner* — Boyer D Ashley
*Assistant Examiner* — Sara Addisu
(74) *Attorney, Agent, or Firm* — Wendy W. Koba

(57) ABSTRACT

An apparatus for cutting a pipe includes a housing with a central aperture for holding the pipe in a fixed position. A rotatable collar is mounted on the outer surface of the fixed housing, with a cutting head attached to the collar. The cutting head is configured to translate forward and backward such that the combination of the rotational movement of the collar and the translational movement of the cutting head is capable of performing complex cuts without ever moving the pipe. A number of different cutting tools (laser, plasma, etc.) may be attached to the cutting head, and a variety of different tasks may be performed including cutting completely through the entire pipe, inscribing on the pipe surface, forming through-holes along the pipe, and the like.

21 Claims, 4 Drawing Sheets

U.S. PATENT DOCUMENTS

| | | |
|---|---|---|
| 6,345,444 B1 | 2/2002 | Gillet et al. |
| 6,581,499 B2 | 6/2003 | Myers |
| 6,615,696 B2 * | 9/2003 | Ricci et al. ............ 82/113 |
| 6,637,115 B2 | 10/2003 | Walsh et al. |
| 6,981,437 B2 | 1/2006 | Ogawa |
| 7,013,567 B2 | 3/2006 | Myers |

* cited by examiner

PIPE CUTTING APPARATUS AND METHOD OF USING THE SAME

CROSS-REFERENCE TO RELATED APPLICATION

This application claims the benefit of Provisional Application No. 60/819,845, filed Jul. 11, 2006.

TECHNICAL FIELD

The present invention related to pipe cutting apparatus and, more particularly, to a cutting apparatus which holds the pipe in a fixed manner such that a cutting head moves radially and laterally about the pipe, the head being processor-controlled to perform any desired complex/compound cut, through-hole and/or inscription on the surface thereof.

BACKGROUND OF THE INVENTION

Generally, when it is desired to cut a pipe, it is mounted in and gripped by a chuck of a lathe and rotated while a non-rotating cutting tool is moved laterally into the rotating pipe. The cutting is accomplished in several successive turns of the pipe as the tool bit is moved gradually into the rotating pipe. The lathe requires a heavy bed which is fixed and contained in a permanent location, such as a machine shop. Additionally, the tool bit requires rigid, yet movable, holding supports. Heavy-duty power equipment is also required to operate the various components of the pipe cutting arrangement.

In the past, the lack of portable pipe cutting equipment required that all pipes be precut before transporting to an installation location. In many instances, however, the precise lengths of pipe needed for a particular installation are not known until the pipe is being installed on a section-by-section basis. When the lathe system is used, frequent trips to the machine shop are necessitated to cut the pipe into the required lengths.

Moreover, when using a fixed lathe, the pipe must be moved axially into the chuck before being clamped therein. This procedure requires sufficient space extending from the chuck to permit maneuverability of the pipe prior to insertion into the chuck.

All of the above necessities naturally resulted in cumbersome and costly procedures and equipment. One prior art cutting tool that addressed some of these concerns is disclosed in U.S. Pat. No. 3,985,051 issued to Charles K. Brown on Oct. 12, 1976, entitled "Apparatus for Cutting and Grooving a Pipe". In the Brown device, a portable frame is used to support a cutting mechanism which is held within an arcuate member. The pipe is held in a fixed position, and the cutting mechanism moved along the arcuate member to perform an initial cut. The pipe is then manually rotated, re-fixed in position, and a second arcuate cut performed. This process continues until the complete circumference of the pipe has been cut.

While an improvement over the prior art in terms of providing a portable cutting tool, the arrangement of Brown remains relatively inefficient and unable to perform complex cuts. U.S. Pat. No. 6,981,437 issued to G. Ogawa on Jan. 3, 2006 discloses a different type of portable pipe cutting machine, where in this case the pipe is held fixed within a clamping device. A rotating, disc-like cutting blade is attached to a revolving member that moves axially about the pipe to perform the cutting motion. Again, however, the ability to create compound cuts (e.g., beveled edges and the like) is limited.

The need to form complex cuts or other designs is an important factor in site-based pipe cutting projects. Indeed, to weld two pieces of pipe together at a joint requires that the cuts on the two pieces be uniform. For example, when the pipe is cut at 90° to its longitudinal axis, bevels at a constant angle must be formed on each pipe. However, when the pipe is cut at an angle to form a mitered joint of, for example, 45°, the angle at which the bevel is cut must vary, since the mitered cut follows an elliptical path over the surface of the pipe. The manner in which this bevel varies is defined by a complicated set of trigonometric equations.

There are also devices in the prior art for cutting pipes and the like at the desired angle of cut and at different angles with selected bevels. For example, U.S. Pat. Nos. 4,143,862 and 4,216,945 both show an apparatus for automatically creating a mitered cut at a varying angle of bevel by rotating a torch and driving mechanism around the pipe. A combination of two servo motors position the cutting torch at a selected point on the surface of the pipe while an additional pair of servo motors set the angle that the torch makes with the surface of the pipe. A profile of the desired cut is then attached to the pipe. An optical sensing device is used to trace the outline of the profile. The mathematical equations defining the bevel angle are translated onto this profile in the form of a curve. This is considered to be a tedious process since each pipe needs a separate profile and, in addition, the profile must be applied to the surface of the pipe with due care.

Various other hand tools may be used to form complicated pipe cuts, but are often considered to be too slow, inaccurate and/or inefficient to utilize in any installation or production facility that requires multiple complex cuts to be performed.

Thus, a need remains in the art for a pipe cutting apparatus that is relatively simple to use, yet is able to repeatedly form complex/compound cuts in an environment where the cut requirements are changeable at a moments notice.

SUMMARY OF THE INVENTION

The need remaining in the art is addressed by the present invention, which relates to pipe cutting apparatus and, more particularly, to an apparatus which holds the pipe in a fixed manner such that the cutting head moves radially and laterally about the pipe, the head being processor-controlled to perform any desired complex/compound cut, through-hole and/or an inscription on the surface thereof.

In accordance with the present invention, a processor (e.g., computer or other suitable processing device) is used to determine the cutting movements, both axial (defined for the purposes of the present invention as ±z-axis) and rotational (defined for the purposes of the present invention as ±θ degrees), required to provide the desired cut. The wall thickness of the pipe (inner and outer diameter values), the composition of the pipe, and the specific tool utilized for cutting the pipe are all taken into consideration as part of the analysis. In one embodiment, the processor may include a monitor to allow for the user to "view" the cut before it is made, providing a visual confirmation that the desired cut pattern will be achieved.

It is an advantage of the apparatus of the present invention that it may be formed as a relatively small and compact unit, allowing for the apparatus to be portable and easily transported to any location where pipe cutting needs to be performed.

Various cutting tools may be used within the cutting head of the present invention, such as a laser-based cutting tool, a hydro-based cutting tool, plasma-arc torch, etc. These particular cutting tools are most useful in providing cuts through metallic pipe. Other cutting tools may be used to cut through pipes formed of other material (such as, but not limited to, glass or plastic-based pipe).

Another feature of the present invention is the ability to control the depth of cut so as to allow for inscriptions to be written into the surface of the pipe without cutting all the way through the thickness of the pipe. For example, markings associated with the pipe manufacturer, vendor, purchaser, etc. may be made by proper programming of the processor-driven cutting head of the present invention. A different set of cutting tools may be used to perform inscription/marking on a pipe surface, where these tools can also be used with the cutting head on the apparatus of the present invention.

It is an advantage of the present invention that a reference position may be defined on the apparatus so that an initial cut location may be registered with respect to the reference position to provide the desired orientation of the cut with respect to the pipe. This is particularly advantageous when forming cuts on opposite ends of a pipe and require a defined orientation of one cut with respect to the other (for example, a first end cut may be rotated 30° with respect to a second, opposing end cut so as to fit between other associated pipe sections).

Further, the use of the processor-based cutting arrangement allows for various cut profiles to be "saved", so that if a number of cuts of the same profile need to be performed time and again, there is no need to re-enter the input data associated with the specific pipe parameters or re-calculate the movements of the cutting head.

In another embodiment of the present invention, a multiple number of axes (beyond translational and rotational) may be incorporated into the processor-controlled cutting operation to allow for pipes having non-cylindrical geometries (e.g., square, rectangular, oval, hexagonal, etc.) to be cut and/or for a sequential number of through-holes/inscriptions to be made along a length of pipe without resetting the pipe in the tool.

Other and further advantages and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
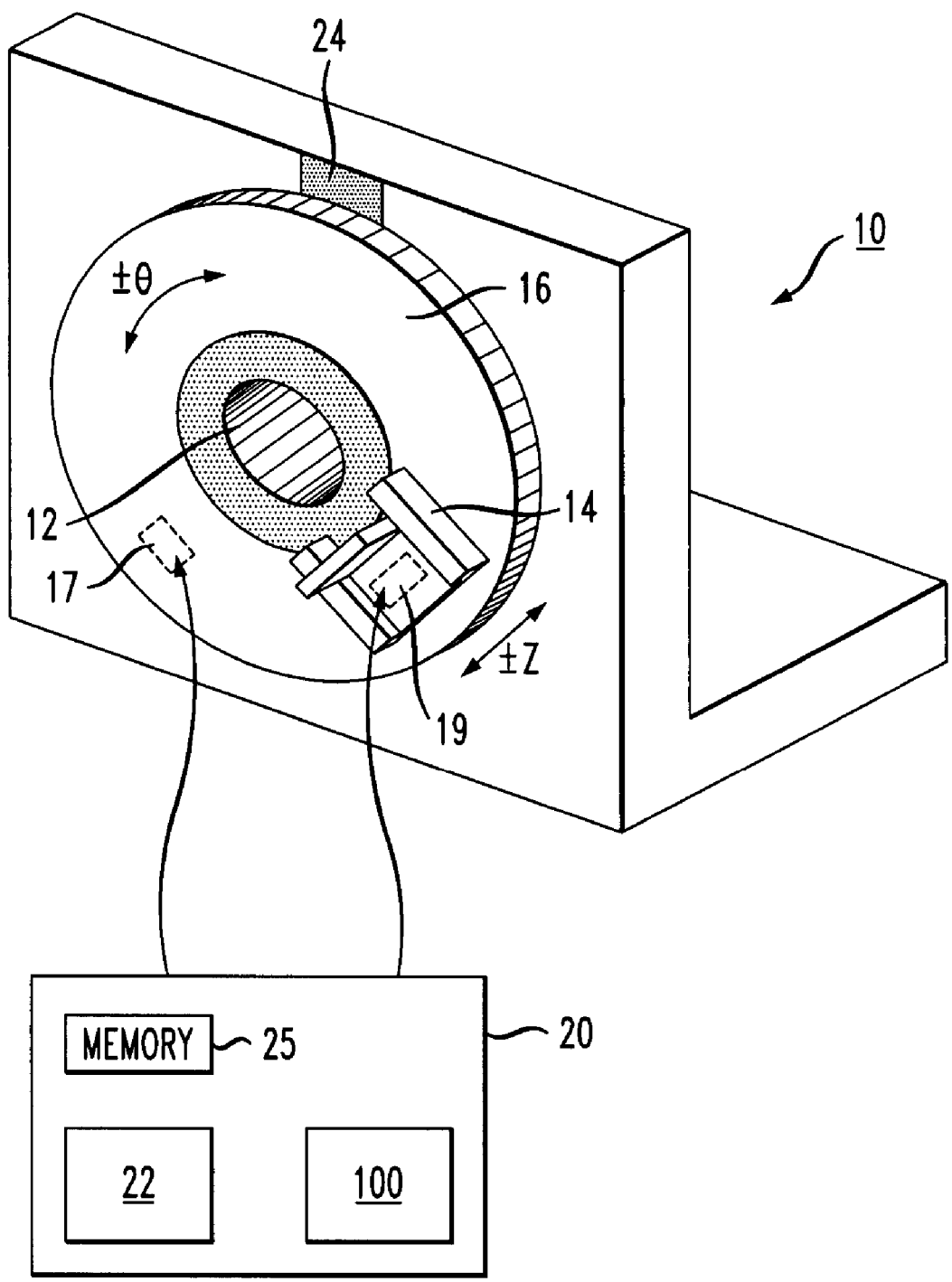
FIG. 1 illustrates an exemplary computer-controlled pipe cutting tool formed in accordance with the present invention.

In accordance with the present invention, the inventive cutting arrangement comprises a processor-controlled cutting apparatus 10, as shown in FIG. 1. Referring to FIG. 1, apparatus 10 includes a central aperture 12 that is used to fixedly hold a pipe (not shown) in place while the cut is being made. While the description of the present invention refers to cutting a "pipe", it is to be understood that this term also refers to a tube, rod or any other element (of any material) in which a cut, through-hole or inscription is desired to be made. As further discussed below, while the particular embodiment of the present invention as shown in FIG. 1 is well-suited for cutting a cylindrical pipe, the apparatus of the present invention may utilize information about multiple axes (beyond translational and rotational) to perform cuts within and along "pipes" of various non-cylindrical geometries.

Referring back to FIG. 1, cutting apparatus 10 further comprises a cutting head 14 that is attached to a rotatable collar 16 so as to move about the fixed pipe in both ±z and ±θ directions (i.e., translational and rotational motions), as shown by the arrows in FIG. 1. Collar 16 is coupled to apparatus 10 in a manner that allows for rotational movement to occur, as controlled by a rotational motorized element 17 (shown in phantom, located behind collar 16). Rotational motorized element 17 is operated, in accordance with the present invention, under the control of an associated processor as discussed below. Cutting head 14 is attached to collar 16 in a manner that also allows for translational movement to occur, as controlled by a translational motorized element 19 (shown in phantom, located behind cutting head 14). Again, translational motorized element 19 is operated under the control of the associated processor. Indeed, a processor 20 is shown in FIG. 1 as coupled to both rotational motorized element 17 and translational motorized element 19. Processor 20 may be formed as an integral element within apparatus 10 or, alternatively, as a separate element coupled to apparatus 10 via the electrical connections to motorized elements 17 and 19. Motorized elements 17 and 19 may comprise stepper motors, servo motors, or any other suitable type of processor-controlled motor capable of providing the degree of movement resolution required for the particular pipe cutting application.

In accordance with the present invention, input data including, but not limited to, the type of cut, composition of the pipe, wall thickness of the pipe, and the like are entered in processor 20 (via, for example, a keyboard 22) and then used by processor 20 to calculate the movements of motorized elements 17 and 19 that are required to define the cut profile. For example, the wall thickness (in terms of the inner diameter and outer diameter of the pipe) may be used to generate a cut profile that transitions the cutting head movement between mating an outer edge of a cut pipe to an inner edge so as to form a better fit between a pair of pipes being joined together. The output from computer processor 20 is a series of commands used to control the motions (either simultaneous or sequential, as need be) of motorized elements 17 and 19, as cutting head 14 rotates about the fixed pipe.

A "registration"/home position 24 may be included on apparatus 10 to define a permanent, fixed location from which to define the starting location for each cutting operation. For example, it may be desired to form a through-hole at a location 45° from registration position 24. Therefore, prior to beginning the cut, cutting head 14 will first rotate 45° from registration position 24, and then initiate the cutting process. In many circumstances, there is a need to form complex cuts at opposing ends of a section of pipe (for example, when using the pipe as a conduit between another pair of pipes). The use of the fixed home location 24 in accordance with the present invention allows for the starting position of the opposing cuts to be controlled so as to provide, in repeatable fashion, the desired orientation between the two cuts.

The holding of a pipe in a fixed position while rotating/translating cutting head 14 through a processor-controlled series of motions is considered to be a significant advance in the state of the art. Moreover, by holding the pipe fixed during the cutting, the apparatus of the present invention allows for bent tubing to be cut in a relatively quick, efficient and safe manner.

As mentioned above, various types of actual cutting tools may be attached to the inventive cutting apparatus and used to perform the cut. For example, plasma-arc cutting devices, laser-based devices, hydro-based cutting tools and the like may be attached to cutting head 14 and utilized to cut through (or into) a pipe, particularly a metal pipe. Other pipe compositions, such as glass or plastic material, may utilize a different type of cutting tool (e.g., air-based, abrasive, etch-based, etc.). Performing surface marking or inscription on a pipe may utilize yet a different type of tool, including but not limited to, a printing head, engraving tool, etc. Indeed, the type of cutting tool is irrelevant to the operation of the apparatus of the present invention and can be of any type desired by the user of the apparatus.

When performing cuts in metallic pipe, the cutting action may result in some of the removed material being re-incorporated on the opposing side of the pipe. In order to avoid this problem a "sacrificial rod" may be inserted within the pipe being cut, where the material being removed will land on this rod, protecting the pipe from contamination.

Figure 2:
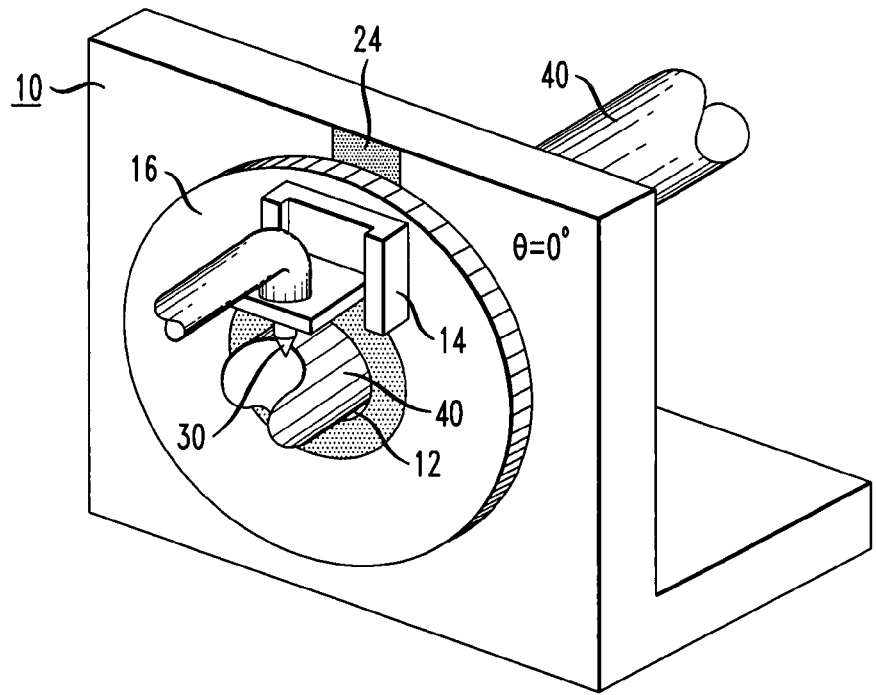
FIGS. 2-6 show various positions of the cutting head of the tool of FIG. 1, as used to create a saddle-shaped cut across a pipe.

FIGS. 2-6 illustrate an exemplary process of forming a 90° saddle cut using the cutting apparatus of the present invention. It is to be understood that this particular cut is exemplary only and virtually any desired design/shape of cut may be formed using the tool of the present invention. FIG. 2 illustrates the cutting apparatus 10 with a cutting tool 30 attached to cutting head 14. In this illustration, cutting head 14 is disposed in its initial "registration"/home position, where subsequent rotation of collar 16 (through the use of rotational motorized element 17) will move cutting head 14 in a counter-clockwise motion (counter-clockwise movement being exemplary). A pipe 40 is illustrated as held within aperture 12 of apparatus 10.

Figure 3:
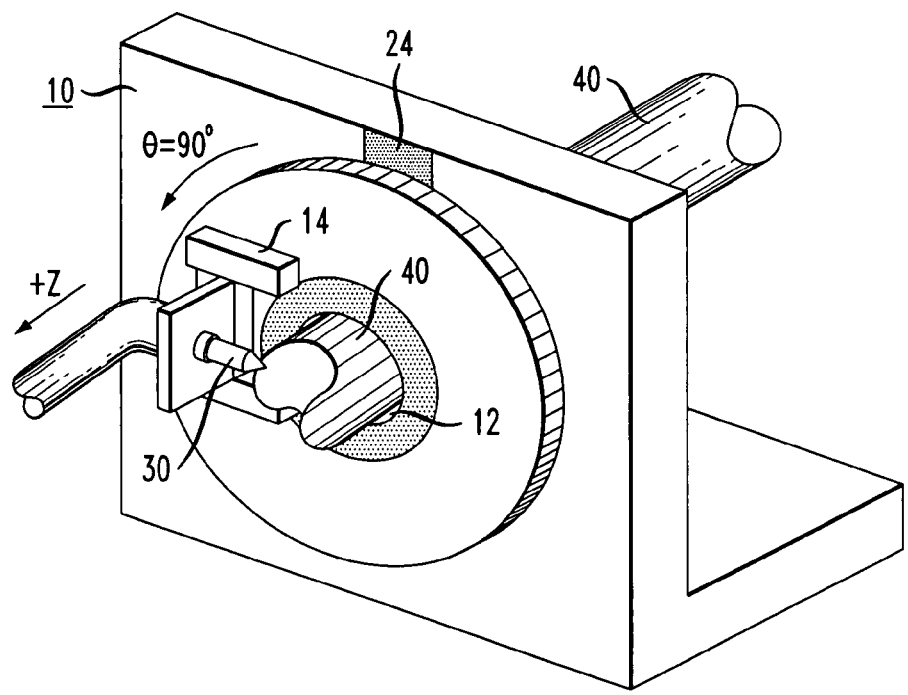
Figure 4:
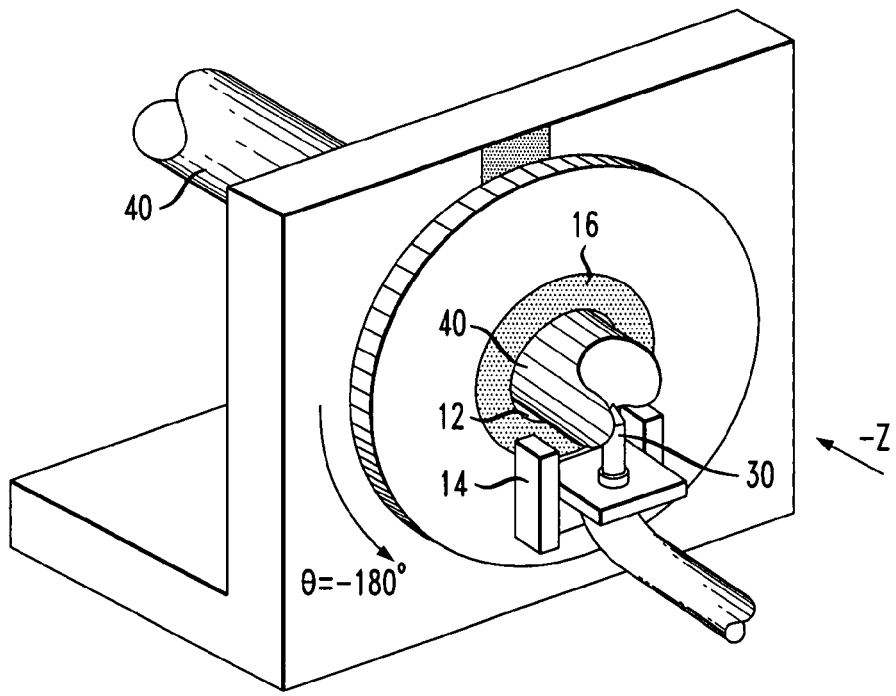
Figure 5:
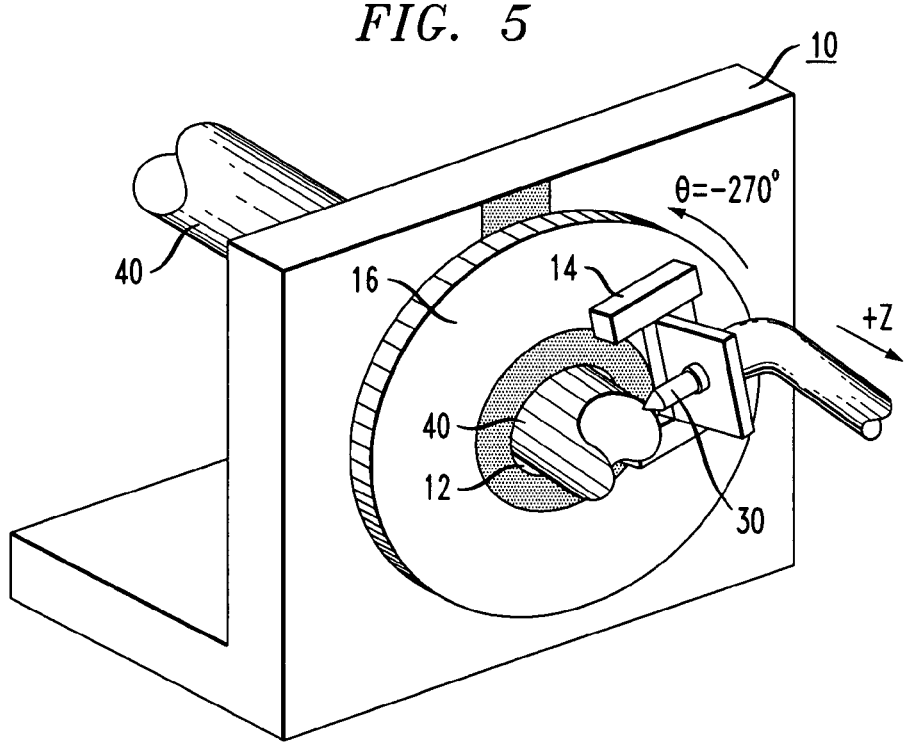
Figure 6:
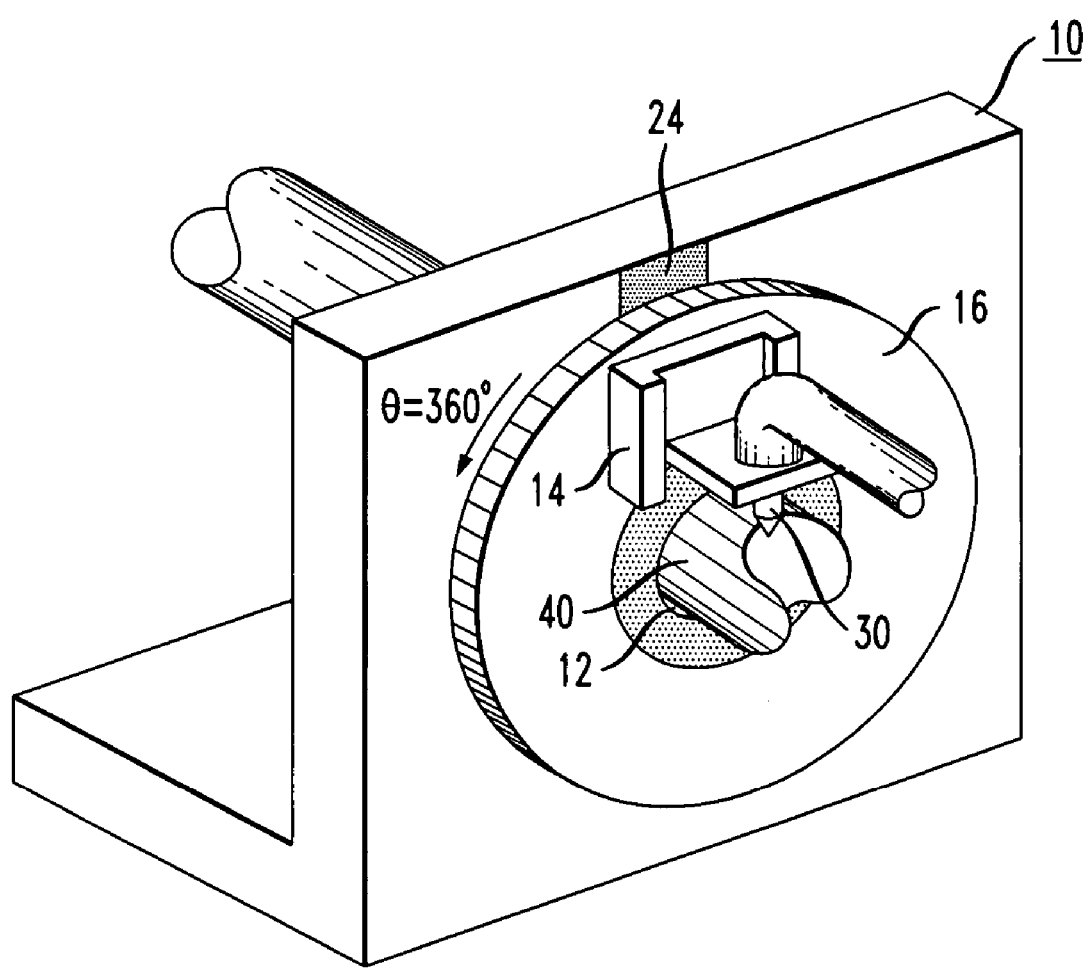

FIG. 3 illustrates the same set-up as in FIG. 2, in this case with cutting head 14 having rotated counter-clockwise to a −90° position. It is further to be noted that the linear movement of translational motorized element 19 has moved cutting head 14 out from its previous position. Further counter-clockwise rotational movement of cutting head 14, via activation of rotational motorized element 17, thereafter positions head 14 at −180° from its initial position, as shown in FIG. 4. It is to be understood that the cutting is taking place as cutting head 14 is rotating, while also providing in this case continual linear movement to generate the desired saddle-type cut, also providing the desired transition between having the outer edge as the joining surface to having the inner edge as the joining surface. FIG. 5 illustrates a further step in the cutting process, as head 14 has rotated to the −270° position. It is to be noted that the cutting device as depicted in FIG. 5 is now in the same linear position as in FIG. 3 (and further out from the position of FIG. 4), in order to make the desired symmetric saddle cut. FIG. 6 illustrates the completion of the process, where cutting head 14 has returned to its initial position.

Possible variations of the cutting process of the present invention may utilize a "lead in" at the beginning of the cutting process (i.e., a predetermined initial cut), followed by a return to the "lead in" portion at the completion of the cutting cycle to achieve a final cut with little evidence of "start" and "stop" locations. Other features include the incorporation of a visible display 100 with processor 20 (see FIG. 1) to show the "shape" of the cut prior to initiating the cutting process, allowing the user to modify the cut as needed to achieve the desired results. The processor may also include a memory 25 (see FIG. 1) for storing a "history" of various cuts that have been made, such that set-up time is reduced when a cut is to be duplicated. Multiple axes may be added beyond the initial rotational and translational movements to allow for types of non-cylindrical pipes (e.g., square pipes, oval pipes, hexagonal, etc.) to be cut by the apparatus of the present invention. Modifications of the various parameters such as rotational/translational speed, referencing to a "home" position, type of tube being cut, etc., are all considered to fall within the scope of the present invention. Further, it is possible to easily "reverse" the cutting pattern to achieve symmetrical cuts inasmuch as the cutting operation is processor-controlled and a calculation can be made of the "reverse" parameters.

It is to be understood that the present invention and its advantages will be understood from the foregoing description and it will be apparent that various changes may be made thereto without departing from the spirit and scope of the invention, or sacrificing all of its material advantages, the form hereinbefore described being merely a preferred or exemplary embodiment thereof.

What is claimed is:

1. Pipe cutting apparatus for creating complex cuts, said apparatus comprising
    a housing assembly including a central aperture for supporting a section of pipe to be cut in a fixed position;
    a rotatable collar attached to an outer surface of the housing assembly so as to encircle the central aperture in a manner that the pipe to be cut is exposed through the rotatable collar;
    a cutting head attached to the rotatable collar
    a first motorized element coupled to both the rotatable collar and the cutting head for imparting rotational motion to the rotatable collar in a manner such that the cutting head performs an axial cut around said pipe to be cut;
    a second motorized element coupled to the cutting head for moving the cutting head in a lateral direction with respect to the housing such that the cutting head performs a translational cut along said pipe to be cut; and
    a processor coupled to the first and second motorized elements and responsive to a plurality of input signals defining the pipe dimensions, material and desired cut profile, the processor for calculating the required combined rotational and lateral movements of the first and second motorized elements required to perform the desired cut and transmitting the cut control commands thereto.

2. Pipe cutting apparatus as defined in claim 1 wherein the processor further includes a memory element for maintaining a record of first and second motorized element rotational and lateral movements, respectively, required to perform a plurality of different, complex cuts.

3. Pipe cutting apparatus as defined in claim 1 wherein the cutting apparatus is configured to perform complete and complex cuts through the thickness of a pipe.

4. Pipe cutting apparatus as defined in claim 1 wherein the cutting apparatus is configured to perform through-hole cuts through the thickness of a pipe.

5. Pipe cutting apparatus as defined in claim 1 wherein the cutting apparatus is configured to perform inscriptions on the surface of a pipe.

6. Pipe cutting apparatus as defined in claim 1 wherein the cutting apparatus further comprises
    a cutting tool coupled to the cutting head such that the termination of the cutting tool is disposed to provide the desired cutting of a section of pipe.

7. Pipe cutting apparatus as defined in claim 6 wherein the cutting tool is selected from the group consisting of: plasma-arc cutting tool, laser-based cutting tool and hydro-based cutting tool.

8. Pipe cutting apparatus as defined in claim 1 wherein the components are integrated sufficient to form a portable pipe cutting apparatus.

9. Pipe cutting apparatus as defined in claim 1 wherein the first and second motorized elements comprise stepper motors.

10. Pipe cutting apparatus as defined in claim 1 wherein the processor further comprises a visual display for illustrating a diagram of a desired cut prior to performing the cutting operation.

11. Pipe cutting apparatus as defined in claim 1 wherein the processor generates a cut profile transferring from an inner pipe edge to an outer pipe edge to form a complex cut for joining to a cylindrical second pipe.

12. Pipe cutting apparatus as defined in claim 1 wherein the apparatus further comprises a registration position from which an initial cut location can be defined.

13. Pipe cutting apparatus as defined in claim 12 wherein the processor further utilizes the registration position to provide a predetermined orientation between a first cut at one location and a second cut at a separate location.

14. Pipe cutting apparatus as defined in claim 1 wherein the processor is further capable of receiving input data for a plurality of axes, generating complex cut information for cylindrical and non-cylindrical pipe geometries.

15. A method of performing complex pipe cutting, the method comprising the steps of:
    attaching a pipe in a fixed position within a cutting apparatus comprising a housing assembly including a central aperture for supporting a section of a pipe to be cut in a fixed position, a rotatable collar attached to an outer surface of the housing assembly so as to encircle the central aperture in a manner that the pipe to be cut is exposed through the rotatable collar, a cutting head attached to the rotatable collar, a first motorized element coupled to both the rotatable collar and the cutting head for imparting rotational motion to the rotatable collar in a manner such that the cutting head performs an axial cut around said pipe to be cut, a second motorized element coupled to the cutting head for moving the cutting head in a lateral direction with respect to the housing such that the cutting head performs a translational cut along said pipe to be cut, and a processor coupled to the first and second motorized elements and responsive to a plurality of input signals defining the pipe dimensions, material and desired cut profile, the processor for calculating the required combined rotational and lateral movements of the first and second motorized elements required to perform the desired cut and transmitting the cut control commands thereto;
    inputting the plurality of input signals to the processor;
    determining the translational and rotational movements required to generate the desired cut; and
    moving the cutting head through translational and rotational movements as commanded by the processor using the first and second motorized elements; and
    cutting the pipe to generate the desired cut profile.

16. The method as defined in claim 15 wherein in performing the cutting step, a complete cut through the pipe wall is formed.

17. The method as defined in claim 15 wherein in performing the cutting step, an inscription on the pipe surface is formed.

18. The method as defined in claim 15 wherein in performing the cutting step, a through-hole in the pipe is formed.

19. The method as defined in claim 15 wherein the method further comprises the step of
    storing the determined translational and rotational movements associated with the desired cut within a memory component of the processor.

20. The method as defined in claim 15 wherein prior to performing the cut, the method includes the step of:
    displaying, on a visual display unit, an intended cut profile, based on the determined translational and rotational movements.

21. The method as defined in claim 15 wherein the method is used to perform at least two separate cuts along a section of pipe with a predetermined orientation therebetween, the method including the further steps of:
    defining a registration position on the housing assembly;
    initiating a first cutting operation at a first location with respect to the registration position; and
    initiating a second cutting operation at a second location with respect to the registration position, wherein the first and second locations are selected to provide the desired predetermined orientation.

* * * * *